United States Patent
Yu

(10) Patent No.: US 10,402,109 B2
(45) Date of Patent: Sep. 3, 2019

(54) SYSTEMS AND METHODS FOR STORING DATA BLOCKS USING A SET OF GENERATED LOGICAL MEMORY IDENTIFIERS

(71) Applicant: OverNest, Inc., Sunnyvale, CA (US)

(72) Inventor: Edward Liang Yu, Sunnyvale, CA (US)

(73) Assignee: OverNest, Inc., Sunnyvale, CA (US)

( * ) Notice: Subject to any disclaimer, the term of this patent is extended or adjusted under 35 U.S.C. 154(b) by 0 days.

(21) Appl. No.: 15/259,863

(22) Filed: Sep. 8, 2016

(65) Prior Publication Data
US 2017/0068477 A1 Mar. 9, 2017

Related U.S. Application Data

(60) Provisional application No. 62/215,438, filed on Sep. 8, 2015.

(51) Int. Cl.
*G06F 3/06* (2006.01)
*G06F 12/14* (2006.01)
(Continued)

(52) U.S. Cl.
CPC ........... *G06F 3/0623* (2013.01); *G06F 3/064* (2013.01); *G06F 3/067* (2013.01); *G06F 3/0643* (2013.01); *G06F 3/0659* (2013.01); *G06F 12/1408* (2013.01); *G06F 16/252* (2019.01); *G06F 21/602* (2013.01); *G06F 21/6209* (2013.01); *G06F 21/6218* (2013.01);
(Continued)

(58) Field of Classification Search
CPC ....... G06F 3/0623; G06F 3/064; G06F 3/0643
See application file for complete search history.

(56) References Cited

U.S. PATENT DOCUMENTS 9,325,791 B1 * 4/2016 Blahaerath .......... H04L 67/1097
9,405,926 B2 * 8/2016 Lewis ................. G06F 21/6218
(Continued)

FOREIGN PATENT DOCUMENTS

WO   WO-2017/044595 A1   3/2017

OTHER PUBLICATIONS

International Search Report and Written Opinion for International Application No. PCT/US2016/050731, dated Dec. 9, 2016.

*Primary Examiner* — Chau Le
*Assistant Examiner* — Vance M Little
(74) *Attorney, Agent, or Firm* — Cooley LLP

(57) ABSTRACT

In some embodiments, an apparatus includes a processor configured to receive an instruction to read a data file within a database and an identifier associated with the data file. The processor is also configured to identify, based on the identifier, a set of logical block identifiers associated with a set of storage locations of the database, and retrieve data stored at each storage location from the set of storage locations using the set of logical block identifiers. The processor is then configured to identify, based on the data stored at each storage location from the set of storage locations, a subset of storage locations from the set of storage locations. The data stored at each storage location from the subset of storage locations pertain to the data file. The processor is configured to compile the data file based on the data within the subset of storage locations.

27 Claims, 8 Drawing Sheets

(51) Int. Cl.
*G06F 21/60* (2013.01)
*G06F 21/62* (2013.01)
*G06F 16/25* (2019.01)

(52) U.S. Cl.
CPC ............... *G06F 2212/1052* (2013.01); *G06F 2212/154* (2013.01); *G06F 2212/163* (2013.01); *G06F 2212/263* (2013.01)

(56) References Cited

U.S. PATENT DOCUMENTS

| | | |
|---|---|---|
| 9,910,999 B1 | 3/2018 | Yu |
| 2008/0117991 A1 | 5/2008 | Peddireddy et al. |
| 2010/0145970 A1 | 6/2010 | Gorti et al. |
| 2012/0330908 A1 | 12/2012 | Stowe et al. |
| 2013/0073870 A1* | 3/2013 | Sauerwald .......... G06F 21/6218 713/193 |
| 2015/0082399 A1* | 3/2015 | Wu ..................... G06F 21/6209 726/6 |
| 2015/0143112 A1 | 5/2015 | Yavuz et al. |
| 2016/0085790 A1 | 3/2016 | Gukal |
| 2016/0299924 A1 | 10/2016 | Fujimoto et al. |

\* cited by examiner

SYSTEMS AND METHODS FOR STORING DATA BLOCKS USING A SET OF GENERATED LOGICAL MEMORY IDENTIFIERS

CROSS REFERENCE TO RELATED APPLICATIONS

The application claims priority to provisional application U.S. Ser. No. 62/215,438, filed on Sep. 8, 2015 and entitled "Zero-Trust Storage", which is incorporated herein by reference in its entity.

BACKGROUND

The embodiments described herein relate to methods and devices for data security. More particularly, the embodiments described herein relate to devices and methods for storing sensitive data on one or more servers accessible by client devices via a network (e.g., in the cloud) without a network administrator (e.g., a cloud operator and/or server administrator) learning certain characteristics about the data being stored to achieve privacy.

A storage cloud can in theory scale to infinite capacity for storing data such as documents. Enterprises, however, are reluctant to store sensitive data in the storage cloud due to security and privacy concerns.

Some known devices and methods for securing the data include breaking apart and/or encrypting each document portion before storing the encrypted document portion in the cloud. Encrypting each document portion in such a manner leaks an unacceptable amount of information about the document. Thus, a need exists for improved devices and methods for securing data stored in the cloud.

SUMMARY

In some embodiments, an apparatus includes a memory and a processor operatively coupled to the memory. The processor is configured to receive, from a compute device, an instruction to read a data file within a database and an identifier associated with the data file. The processor is also configured to identify, based on the identifier, a set of logical block identifiers associated with a set of storage locations of the database, and retrieve data stored at each storage location from the set of storage locations using the set of logical block identifiers. The processor is then configured to identify, based on the data stored at each storage location from the set of storage locations, a subset of storage locations from the set of storage locations. The data stored at each storage location from the subset of storage locations pertain to the data file. The processor is configured to compile the data file based on the data within the subset of storage locations and send the data file to the compute device. The processor is further configured to modify an initialization vector for the data stored at each storage location from the set of storage locations to define modified data for each storage location from the set of storage locations. The processor is configured to send a signal to the database to write the modified data for each storage location from the set of storage locations to that storage location from the set of storage locations within the database.

DETAILED DESCRIPTION

Figure 1:
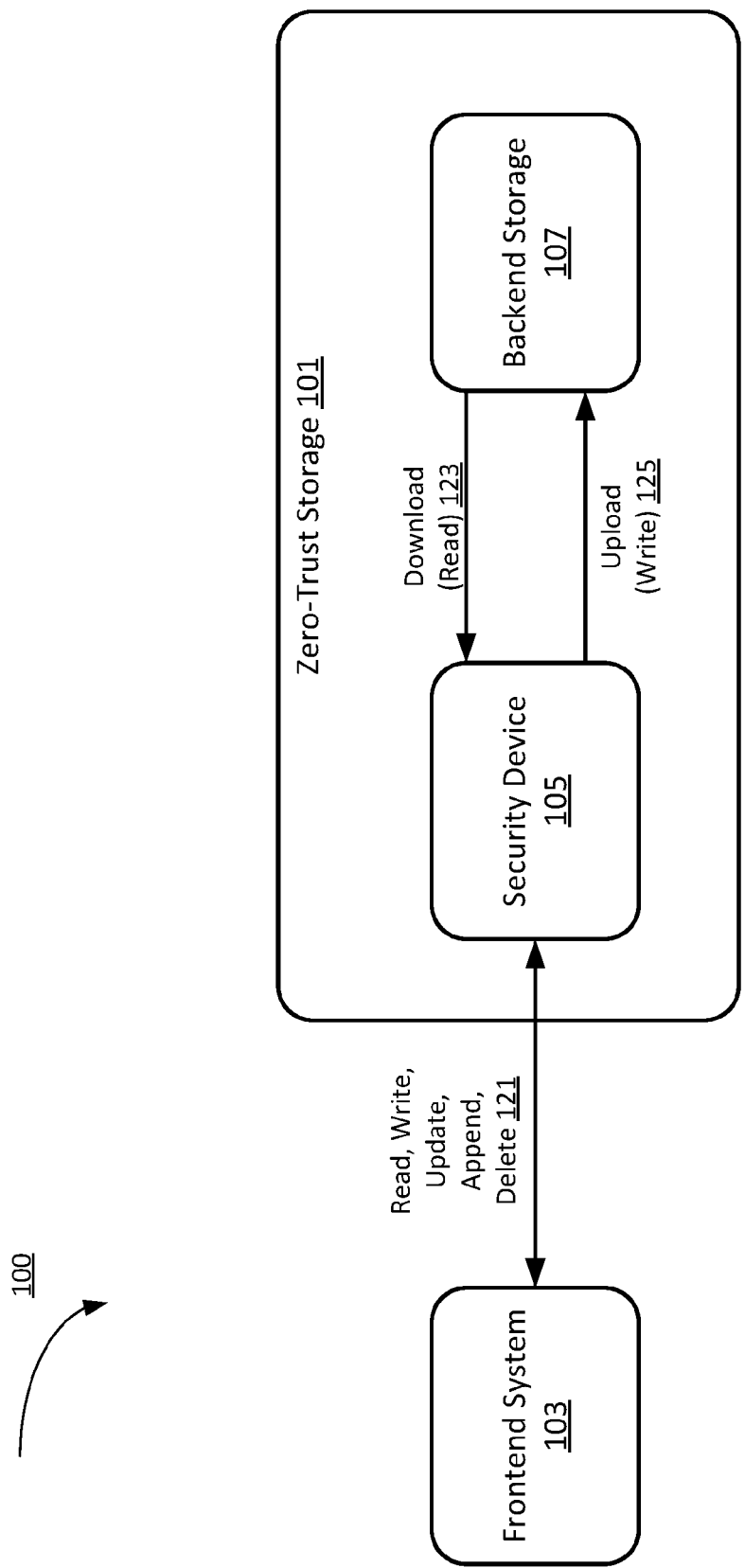
FIG. 1 is a schematic block diagram of a system using zero-trust storage, according to an embodiment.

In some embodiments, an apparatus includes a memory and a processor operatively coupled to the memory. The processor is configured to receive, from a compute device, an instruction to read a data file within a database and an identifier associated with the data file. The processor is also configured to identify, based on the identifier, a set of logical block identifiers associated with a set of storage locations of the database, and retrieve data stored at each storage location from the set of storage locations using the set of logical block identifiers. The processor is then configured to identify, based on the data stored at each storage location from the set of storage locations, a subset of storage locations from the set of storage locations. The data stored at each storage location from the subset of storage locations pertain to the data file. The processor is configured to compile the data file based on the data within the subset of storage locations and send the data file to the compute device. The processor is subsequently configured to modify an initialization vector for the data stored at each storage location from the set of storage locations to define modified data for each storage location from the set of storage locations. The processor is configured to send a signal to the database to write the modified data for each storage location from the set of storage locations to that storage location from the set of storage locations within the database.

In some embodiments, an apparatus includes a security module and a storage module. The security module is configured to interface the storage system with the rest of the system (e.g., the backend storage). In an upload process, the security module is configured to break (separate, parse) each document into data blocks (also referred to herein as "segments," and "portions"), encrypt each data block, and then upload each data block to the backend storage for storage. In a download process, the security module is configured to download the data blocks of a document, decrypt the data blocks of the document and then combine the data blocks to reconstruct the document. For both the upload process and the download process, the security module can be configured to hide and/or obfuscate, from the rest of the system (e.g., the backend storage), the access pattern and the storage locations of each of the data blocks.

In some embodiments, a zero-trust storage system, for example, can be configured to store data and hide the operations of the storing and the target of the memory location where the data is stored. In some implementations, for example, a zero-trust storage system is a storage system configured to store data without storing and/or maintaining, for example, the data's meta-data, content of the data, a key used to encrypt the data, a storage location of the data within the storage system, a storage operation associated with storing the data, and/or the like.

As used herein, the term "oblivious" refers to "zero-trust". Oblivious can be used, for example, as a term describing a system that has a primary action but doesn't store an identifier associated with the target of the primary action. For example, in this particular case, oblivious storage can be a storage system that has no useful knowledge of the meta-data or the data stored within the system. For example, the oblivious storage does not store any indication of and/or is not provided any indication of the meta-data or the data content stored within the system.

The term "meta-data" refers to information of the data that is not contained in the content of the data but nevertheless can be kept and/or identified by a storage system. For example, for a typical file document, the meta-data can include the file name, file size, file type, file location and/or the like.

The term "document" can refer to, for example, a document, a data structure and/or a file stored in the storage system. A document can be, for example, a data file, a video, an image, a webpage, a message such as email or a chat message, a record in a database system, and/or the like. A document can be some data that can be stored in the storage system.

The term "document pointer" refers to a pointer to the document. A pointer can be a numeric and/or alphanumeric identifier, or an abstraction such as the file path based on the underlying file system. A pointer can be a piece of information that can identify a document in the storage system. A pointer can also be referred to as a document identifier or document ID.

The term "storage operations" can refer to, for example, operations or actions supported by a storage system. Typical operations can include, for example, read, write, update, append, delete, and/or the like.

The term "storage" refers to any suitable storage system such as, for example, a physical storage system or a cloud-based storage system. A storage includes a memory that allows storage of document(s) that can be subsequently retrieved.

The term "storage unit" refers to a unit of operation used by a storage system. For instance, for a file system (e.g., Windows New Technology File System (NTFS)), the storage unit can be a file; for a database system (e.g., MySQL database), the storage unit can be a record or a row; for an object store (e.g., Amazon S3), the storage unit can be an object; and for a block-based storage array (e.g., DataDirect Networks), the storage unit can be a block. For a zero-trust storage, internally the storage unit can be a logical block.

The term "pseudorandom number generator" or the term "randomizer module" refers to a module configured to generate a sequence of numbers whose properties approximate the properties of a sequence of random numbers. The generated sequence can be pseudorandom because given the same seed the same sequence can be reproduced. In some instances, the pseudorandom number generator can take as inputs, for example, a seed, a range, and/or a cryptographic key. The range can determine a range of output numbers generated by the pseudorandom number generator. The seed is described in further detail herein. In some implementations, the cryptographic key can be predetermined and hidden from any device and/or module accessing and/or interacting with the pseudorandom number generator. In other instances, the device and/or module accessing the pseudorandom number generator can supply a cryptographic key to the pseudorandom number generator to customize the process used to generate the sequence of numbers so that given the same seed and same range, the sequence of numbers can be different if different cryptographic keys are provided. The reverse is also true, for the same pseudorandom number generator and thus the same process, if the same cryptographic key, seed, and range are provided, the same sequence can be generated.

The term "seed" can be a set of initial values (or a single value) that is provided to a pseudorandom number generator to generate a sequence of pseudo-random numbers. In some implementations, given the same seed to the same pseudorandom number generator, the sequence of numbers generated can be the same.

The term "encryption" refers to any cryptographic method to encode a document so that only authorized parties can read/access it. The term "decryption" refers to any cryptographic method to decode a document so that the encoded document can be decoded and read by authorized parties.

The term "initialization vector" refers to a nonce (number used once). In some implementations, the initialization vector can be an input similar to a key used with the encryption process. In some implementations, not all encryption mechanisms use an initialization vector. The property of the initialization vector can depend on the encryption process. For example, for some encryption processes the initialization vector can be random or pseudorandom. For another example, in other encryption processes the initialization vector is non-repeating. For some encryption schemes, however, the initialization vector can be made public even if it is random or non-repeating.

As used herein, a module can be, for example, any assembly and/or set of operatively-coupled electrical components, and can include, for example, hardware like a memory, a processor, software (executing in hardware), and/or the like. As used herein, the singular forms "a," "an" and "the" include plural referents unless the context clearly dictates otherwise. Thus, for example, the term "a zero-trust storage" is intended to mean a single zero-trust storage or a set of zero-trust storages with similar functionalities. For another example, the term "a data file" is intended to mean a single data file or a set of data files.

FIG. 1 is a schematic block diagram of a zero-trust storage system using zero-trust storage, according to an embodiment. In some embodiments, the zero-trust storage system 100 includes a zero-trust storage 101 and a frontend system 103. The frontend system 103 is operatively coupled to the zero-trust storage 101. The zero-trust storage 101 can include a security device 105 and a backend storage 107 operatively coupled to the security device 105.

The backend storage 107 can be configured to store documents. The backend storage 107 can be, for example, a cloud storage service such as, for example, Amazon Web Services (AWS)™, Microsoft Azure™, or a physical storage array, or can be a simple in-memory database, file system, or a data structure. An example of a file that can be securely stored in the backend storage 107 using the security device 105 includes an encrypted search index (e.g., a secure index of encrypted data that can be used to search the encrypted data). For other examples, any other suitable file and/or data can be stored in the backend storage 107. In some implementations, the backend storage 107 can support two operations equivalent to download 123 and upload 125 (such as receive/send or read/write). The security device 105 can translate the upload and download operations to the operations supported by the backend storage 107. The backend storage 107 can use an internal unit of storage. Some common terms used by the backend storage 107 for each of the units can be, for example, a bucket, an object, a slot, a record, a blob, a box, and/or a file.

The frontend system 103 refers to the portions of the zero-trust storage system 100 that uses the zero-trust storage 101 (e.g., that interfaces with the security device 105). The frontend system 103 can be a compute device (or set of compute devices) having a processor and a memory. For example, the frontend system 103 can be a document management system, a file system, another storage system, or any system that uses a storage system to store data for its operation(s). In some implementations, the frontend system 103 can be a cloud storage system. The frontend system 103 can support a set or a subset of operations similar to read, write, update, append, and delete 121. The frontend system 103 communicates with the zero-trust storage 101 in the same way as communicating with any other storage system (not shown in FIG. 1). For example, the frontend system 103 stores data to the zero-trust storage 101 and the data can subsequently be retrieved from the zero-trust storage 101 using an identifier. In other words, the frontend system 103 does not have store or observe details of the encryption/decryption processes, the download and upload processes performed by the zero-trust storage 101, as discussed in detail herein with respect to FIGS. 3-8. In some implementations, the frontend system 103 can be an application (or software executing in hardware) such as a mobile application or a web application that stores/fetches data. In some embodiments, the Frontend system 103 can run and/or execute on a client device (e.g., mobile device, personal computer, etc.) and can communicate with the security device 105 via a network (e.g., the Internet, an intranet, a local area network (LAN), a virtual private network (VPN), a wireless LAN (WLAN), a wired network, a wireless network and/or the like).

The security device 105 can include a processor and a memory and can be an interface between the backend storage 107 and the frontend system 103. The security device 105 can include hardware modules and/or software modules (e.g., stored in memory and/or executed by a processor). The security device 105 can include any combination of hardware-based modules (e.g., a field-programmable gate array (FPGA), an application specific integrated circuit (ASIC), a digital signal processor (DSP)) and/or software-based modules (e.g., a module of computer code stored in memory and/or executed at the processor) capable of performing one or more specific functions associated with that module. In some embodiments, the security device 105 can be a compute device, a server, a host device, and/or the like.

The security device 105 presents a normal storage interface such as a block storage interface, an object store interface, a remote file system, a mountable file system interface and/or the like. In some embodiments, the frontend system 103 does not receive and/or store identifiers associated with the location at which the data is stored in the zero-trust storage 101 but can refer to the documents using the identifier to which the frontend system 103 is accustomed (e.g., using an identifier specific to the frontend system). For example, the frontend system 103 can use a file-system interface such as files and directory to refer to each document using a path of the document. The frontend system 103 can also refer to the documents using some kind of document identifier (e.g., using an identifier specific to the frontend system) as if using an object store. The frontend system 103 can thus call the security device 105 with the typical file operation such as reading a file or writing a file. In some instances and as described in further detail herein, the security device 105 is configured to translate each frontend operation into a download request 123 and then an upload request 125.

In some instances, the zero-trust storage 101 can interact with the users through the frontend system 103. In some instances, the frontend system 103 can, for example, interact with the zero-trust storage 101 using typical storage operations (or a subset of) such as read, write, update, append, and delete. The security device 105 can translate the frontend system storage units to the backend storage units and the operations to a set of download and upload operations to be executed by the backend storage 107. In some implementations, the backend storage system 107 can be separate from (or not part of) the zero-trust storage 101 because zero-trust storage 101 can use any suitable backend storage technology. From the perspective of the frontend system 103, the backend storage 107 is part of the zero-trust storage 101 because the security device 105 overlays and transforms the backend storage 107 into a zero-trust storage 101.

In some implementations, multiple frontend systems can be operatively coupled to the security device 105. Thus, data from these multiple frontend systems can be stored to the same backend storage 107 via the security device 105. In some implementations, multiple security devices and/or multiple backend storages can be operatively coupled to the frontend system 103. Data from the frontend system 103 can be stored to the multiple backend storages via the multiple security devices.

Figure 2:
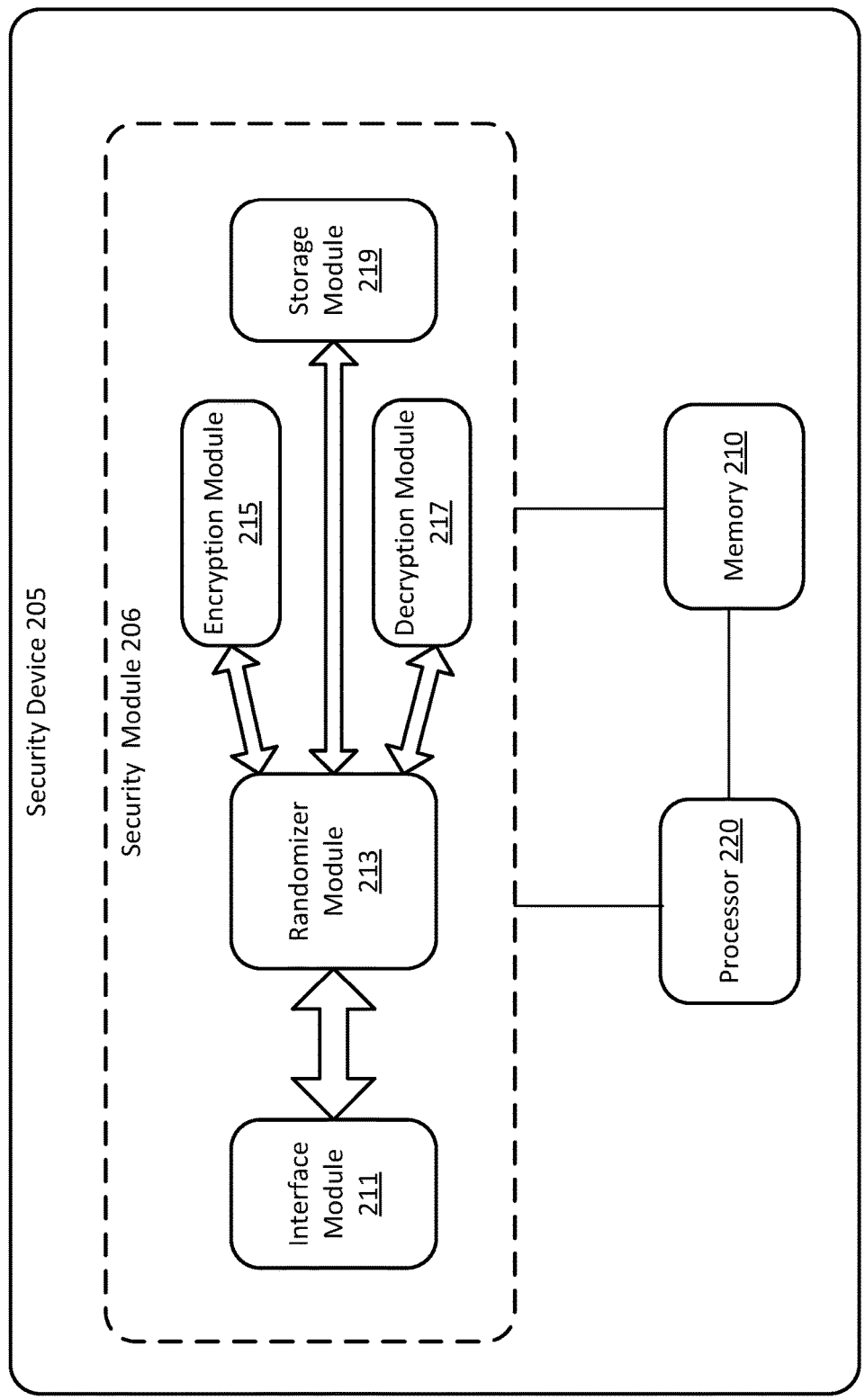
FIG. 2 is a schematic block diagram of a security module within a zero-trust storage system, according to an embodiment.

FIG. 2 is a schematic block diagram of a security device 205 within a zero-trust storage, according to an embodiment. The security device 205 within a zero-trust storage (such as the zero-trust storage 101 in FIG. 1) can include a security module 206, a processor 220, and a memory 210. The security module 206 can include an interface module 211, a randomizer module 213, an encryption module 215, a decryption module 217, and a storage module 219. The security device 205 can be structurally and functionally similar to the security device 105 discussed with respect to FIG. 1. Each operation(s) of the interface module 211, the randomizer module 213, the encryption module 215, the decryption module 217, the storage module 219, as well as the memory 210, can be controlled by the processor 220. Each module or component in the security device 205 can be hardware modules and/or software modules (stored in memory 210 and/or executed by a processor 220). Each module or component in the security device 205 can be any combination of hardware-based modules (e.g., a field-programmable gate array (FPGA), an application specific integrated circuit (ASIC), a digital signal processor (DSP)) and/or software-based modules (e.g., a module of computer code stored in memory 210 and/or executed at the processor 220) capable of performing one or more specific functions associated with that module. Each module or component in the security device 205 can be operatively coupled to the other modules/components in the security device 205. As discussed herein, the security device 205 and its components can be stored and/or executed on a server, host device, client device, and/or the like. In some embodiments, some components of the security device 205 can be stored and/or executed on a first device (e.g., a server) and other components of the security device 205 can be stored and/or executed on a second device (e.g., a client device) operatively coupled to the first device via a network (e.g., the Internet).

In some instances, the interface module 211 is operatively coupled with the frontend system (such as the frontend system 103 in FIG. 1) and the randomizer module 213. The randomizer module 213 is operatively coupled with the storage module 219, the encryption module 215, and the decryption module 217. Because the communication with the storage module 219 can be via encrypted logical blocks of data, the randomizer module 213 can use the encryption module 215 to encrypt logical data blocks before sending the encrypted logical data blocks to the storage module 219. The randomizer module 213 can also use the decryption module 217 to decrypt logical data blocks after receiving the data blocks from the storage module 219.

In some embodiments, the security device 205, a backend storage (such as the backend storage 107 in FIG. 1; also referred to herein as the backend storage) and a frontend system (such as the frontend system 103 in FIG. 1) are stored and/or executed on separate compute devices communicatively coupled together via a network (e.g., the Internet) (not shown). Such compute devices can include processors (e.g., to execute modules, to use application program interfaces (APIs), and/or the like) and memories (e.g., to store data and/or instructions for execution by the processor). In other embodiments, the security device 205, the backend storage (such as the backend storage 107 in FIG. 1) and the frontend system (such as the frontend system 103 in FIG. 1) can be stored and/or executed on a common device.

Returning to FIG. 2, the interface module 211 is a translation layer of the security device 205 that interfaces with the frontend system (such as the frontend system 103 in FIG. 1). Depending on the frontend system, the interface module 211 can support different frontend system storage application programming interfaces (APIs). Functionality-wise, the interface module 211 can support read, write, update, append, and/or delete requests. In some cases, the interface module 211 can receive a request from the frontend system and can then translate the request to a uniform request and/or a request used and recognized by the components of the security module 206. The interface module 211 can also translate an identifier used by the frontend system to a storage system identifier used by the rest of the system (e.g., the remaining modules of the security module 206 and/or the backend storage), and a seed used by the randomizer module 213 described in further detail herein. In some instances, the frontend identifier can be translated and/or used to define a seed using a seed mapping function (e.g., a hash function, or a cryptographic pseudorandom hashing function) with the frontend identifier as an input to the seed mapping function. The seed mapping function can then be used as the translation function. In other instances, any function that translates an identifier to a number (or a set of numbers) deterministically can be used by a seed mapping function. Using a deterministic function for the seed-generating function optimizes and/or improves an accessing pattern of the backend storage. The more random the locations of the actual storage units used by backend storage, the more difficult it can be for the backend storage (or anyone who has access to the backend storage such as a system administrator of the system) to figure out and/or identify the potential locations of the storage units used by the backend storage to store a specific file or datum. Thus, data can be privately and randomly stored at the backend storage.

The randomizer module 213 can be configured to translate the uniform access request from the interface module 211 to a sequence of download and upload requests. In some instances, the input from the interface module 211 includes an identifier used by the remaining modules of the security module 206 to refer to the document, the seed, the operation, and the document content in the case of write/append. In some instances, both a download request and an upload request are executed to ensure the backend storage cannot differentiate the operations among read, write, update, append, and delete. Similarly stated, each of the requests look the same to the backend storage system. This prevents leaking an access pattern of zero-trust storage (such as the pattern used by the zero-trust storage 101 in FIG. 1). The randomizer module 213 can map the numbers generated by a pseudorandom number generator given the seed to a set of logical block numbers (or a set of logical block identifiers) used by the zero-trust storage. In some implementations, the set of logical block identifiers are not stored in long-term memory. Instead, each time the frontend system accesses specific data, the set of logical block identifiers can be identified and/or calculated using the pseudorandom number generator and the seed.

Each logical block identifier can map to the storage unit used by the underlying backend storage as described below. In this implementation, the seed can be used to map to the location of blocks of data stored in the backend storage. Similarly stated, the seed can be used as a key to identify where to store the blocks of data in the backend storage and similarly which blocks of data to retrieve from the backend storage. In other implementations, the seed can be combined with an additional cryptographic key (or other identifier) to generate a sequence of numbers identifying where to store the blocks of data in the backend storage and similar which blocks of data to retrieve from the backend storage. Similarly stated, using the seed and the cryptographic key, the sequence generated by the randomizer module 213 can be further randomized. Each number from the sequence of numbers can map to a location in the backend storage storing a portion of the data. The portion of data stored at each memory block of the backend storage pertains to the data file.

In some implementations, the identifier used by the frontend system (the frontend identifier) for a specific file and/or access request can be processed by the randomizer module 213 and mapped to a seed mapping function (also referred to herein as a "mapping function"). The seed mapping function can be, for example, a hash function or a cryptographic pseudorandom hashing function. In such an instance, each time the frontend system requests a specific file or data, the randomizer module 213 can use the seed mapping function (with the identifier used by the frontend system as an input) to identify the seed. Thus, in such instances, the randomizer module 213 can be configured to calculate the seed each time the frontend system requests data from the zero-trust storage. In such instances, the randomizer module 213 can use the frontend identifier for a particular file and/or block of data as an input to the seed mapping function to recalculate and/or recreate the seed each time a request is made with that frontend identifier. The seed and thus the sequence of numbers (the set of logical block identifiers) generated by the seed can then be used to retrieve the blocks of data associated with that file and/or data using the seed. The set of logical block identifiers are associated with a set of storage locations of a database in the backend storage. In other instances, a mapping between the frontend identifier and the seed can be used to identify the seed. In still other instances, the frontend identifier can be the seed used to identify the sequence of numbers used to store and/or retrieve the different blocks of data associated with that file and/or data. In some instances, the identifier is defined by and is specific to the frontend system (e.g., a file path used by the frontend system to store and access the file and/or data).

In some instances, the seed generation can be based on the frontend identifier or a uniquely identifying property of the data such as a file name, a file path, a record locator, a hash of one or more properties of the data, and/or the like. This allows a user of the system to regenerate the seed from the same frontend identifier or uniquely identifying property of the data. Given the same seed mapping function, the same pseudorandom number generator process, and the same set of cryptographic keys, the security module 206 can uniquely map to the correct possible set of data blocks used by the backend storage.

The encryption module 215 can be used by the randomizer module 213 to encrypt each data block (e.g., portion of a file) before uploading the data block to the backend storage through the storage module 219. The encryption scheme used by the encryption module 215 can be any suitable encryption scheme. In some implementations, the encryption scheme can be modified and/or pluggable as long as the encryption can be decrypted (e.g., by the decryption module 217) and can scale to the logical block size (e.g., the size of each portion of the file) used by the security module 206. This allows the overall system to swap out "old" encryption schemes that are later found to be either too slow or unsecure and to replace such old encryption schemes with new and improved encryption scheme(s). In some implementations, the encryption module 215 and the decryption module 217 have access to the encryption key, but the interface module 211, the randomizer module 213 and the storage module 219 do not have access to the encryption key. Thus, in some implementations, the encryption module 215 and/or the decryption module 217 can also interact with a key management system (not shown in FIG. 2) and/or a trust platform module (not shown in FIG. 2). In other implementations, the encryption key can be implemented and/or stored by an existing key management system (not shown) either in hardware or software (stored in memory and/or executed in a processor). This makes the architecture extremely flexible and secure because key use is isolated to a small portion of the system and the key is not propagated to other modules of the security module 206 or the backend storage system. In such implementations, this helps to ensure that the backend storage is zero-trust. In still other implementations, the seed generated by the randomizer module 213 can be used as an input to the encryption module 215 and used as an input and/or an encryption key to an encryption function to encrypt the data. In such implementations, for example, the final encryption key can be a function of the stored encryption key and the seed. In such a manner, the final encryption key can be further obscured based on the seed.

The decryption module 217 can be configured to receive and decrypt encrypted data stored in the backend storage using a decryption key that can be a compliment to the encryption key. Such a decryption key can be the same as the encryption key, can be stored with the encryption key, can be stored remote from the encryption key, can be paired with the encryption key and/or the like. In other implementations, the seed can be used by the decryption module 217 as a decryption key and/or as a way to further obscure the decryption key when decrypting the data. In some instances, the same module can act as both the encryption and the decryption modules.

The storage module 219 can be configured to interface with a backend storage. The storage module 219 can handle reading/writing to the underlying storage system using an API or abstraction exposed by the backend storage and mapping the logical block used by the randomizer module 213 to the storage unit used by the backend storage. For example, if AWS S3 is used, the storage module 219 API will be using the S3 API to upload and download encrypted storage unit to the S3 system. The storage module 219 can translate the logical blocks to the S3 storage units such as buckets and/or objects. The storage module 219 can be configured to hide and/or obscure the different interfaces (APIs) of the underlying backend storage so the zero-trust security module 206 can treat the backend storage as a "dumb" storage system with only upload or download operation. This allows the zero-trust storage system (such as the zero-trust storage system 100 in FIG. 1) to be backend agnostic and pluggable. Accordingly, different backend storage and/or protocols can be used. This also allows the zero-trust storage system to secure either a cloud storage system or a physical storage array. In some instances, data passing through the storage module 219 is encrypted by the encryption module 215 prior to being sent to the storage module 219.

The memory 210 can be, for example, a random-access memory (RAM) (e.g., a dynamic RAM, a static RAM), a flash memory, a removable memory, a hard drive, a database and/or so forth. In some implementations, the memory 210 can include (or store), for example, a database, process, application, virtual machine, and/or other software modules (stored and/or executing in hardware) and/or hardware modules configured to execute a zero-trust storage process and/or one or more associated methods for the zero-trust storage. In such implementations, instructions for executing the zero-trust storage process and/or the associated methods can be stored within the memory 210 and executed at the processor 220.

The processor 220 can be configured to, for example, write data into and read data from the memory 210, and execute the instructions stored within the memory 210. The processor 220 can also be configured to execute and/or control, for example, the operations of the security module 206, the interface module 211, the randomizer module 213, the encryption module 215, the decryption module 217, and the storage module 219. In some implementations, based on the methods or processes stored within the memory 210, the processor 220 can be configured to execute zero-trust storage processes, as described in FIGS. 3-8.

While shown and described in FIG. 2 as being within a single security device 205, in other embodiments, the components and modules of the security device 205 can be distributed between multiple devices. For example, in such other embodiments, the interface module, randomizer module, encryption module, decryption module, and/or storage module can be distributed across two or more compute devices operatively coupled via a network. In such other embodiments, the one or more compute devices can work together to implement the functions of the security module.

Figure 3:
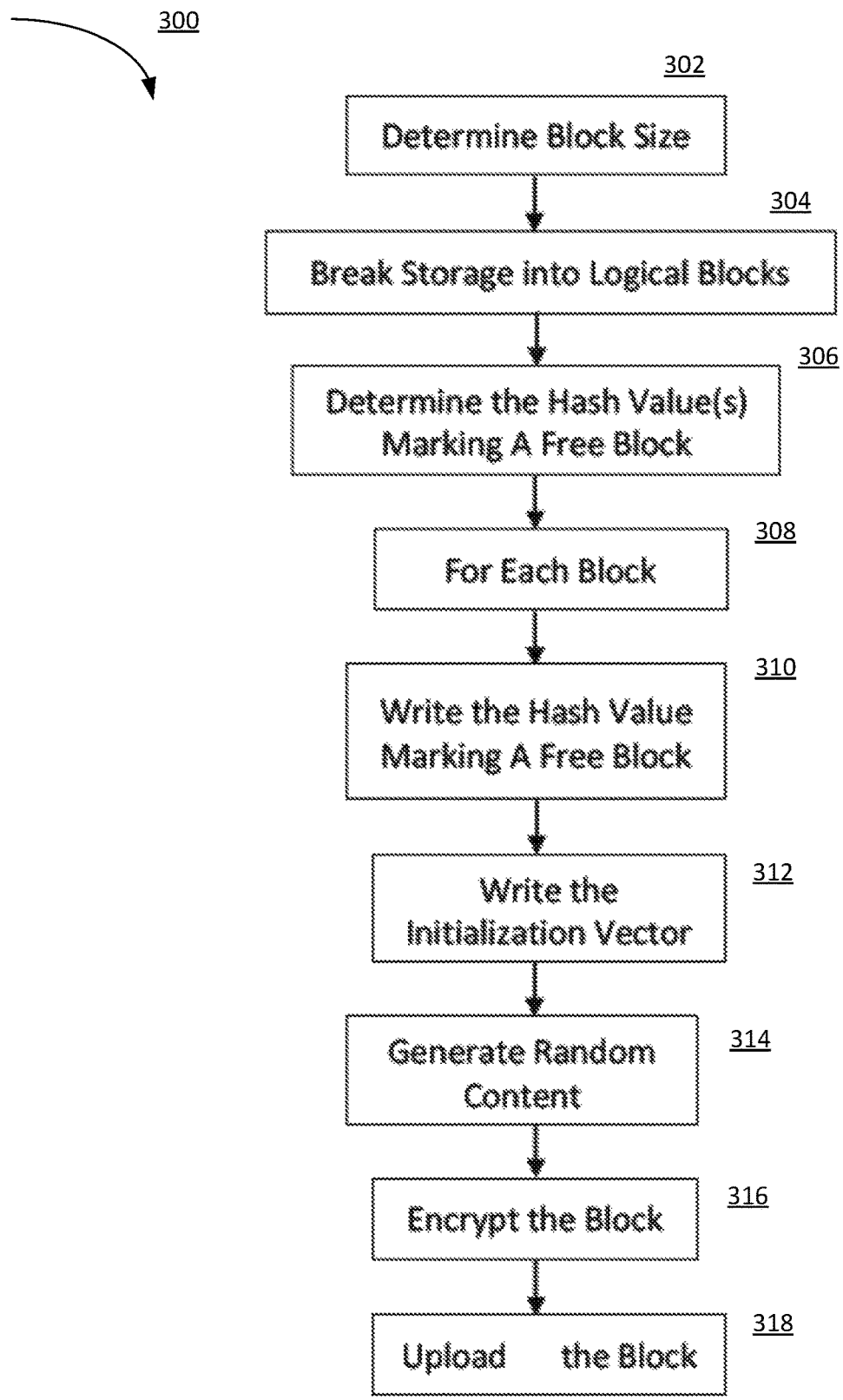
FIG. 3 is a flowchart illustrating a method of an initialization process, according to an embodiment.

FIG. 3 is a flowchart illustrating a method 300 of an initialization process, according to an embodiment. This method 300 can be implemented at a processor and/or a memory (e.g., processor 220 or memory 210 as discussed in FIG. 2) of a security device (such as the security device 105 in FIG. 1 and the security device 205 in FIG. 2). In some instances, the initialization process 300 can be used to prepare a backend storage (such as the backend storage 107 in FIG. 1) for implementing zero-trust storage (such as the zero-trust storage 101 in FIG. 1). In some instances, the initialization process 300 can be executed before any documents are uploaded or as part of a batch upload operation for an initial set of documents. In other instances, the steps in the initialization process 300 can be performed as each memory block (e.g., storage location) is used for the first time. By performing the steps of the initialization process as a standalone step or during an initial batch upload operation, the initialization process 300 can effectively hide existence of documents in the zero-trust storage.

At 302, the processor (such as the processor 220 of the security device 205 in FIG. 2) determines a block size of the backend storage (e.g., a block size supported by the backend storage). At 304, the processor then breaks the backend storage into a set of logical memory blocks based on the block size. Each logical memory block from the set of logical memory blocks is associated with a logical memory block identifier. To treat the backend storage uniformly, the security device (e.g., the randomizer and/or storage module executed by a processor) can treat the backend storage as a logical storage with a naming scheme based on a logical block number (or a logical block identifier). The security device (e.g., the randomizer and/or storage module executed by a processor) can, according to the actual backend storage used, map the logical block number to some combination of each logical storage unit used by the backend storage.

The security device can then map the backend storage logical storage unit to a set of logical memory blocks (e.g., used by the randomizer module). To break the backend storage logical storage unit into the logical memory blocks, the security device can use a logical block size. This block size can be determined either algorithmically based upon sample documents or as an input specified by the user (or a system administrator).

At 306, the security device (e.g., the randomizer and/or storage module executed by a processor) can differentiate logical memory blocks marked as free and logical memory blocks used by documents already in the security device. One way to do so is by using a pre-determined hash or identifier value (e.g., all zeroes, all ones) or a set of hash or identifier values to identify free logical memory blocks. Alternatively, a function can be applied that determines whether a logical memory block or a set of logical memory blocks are free. In either case, for each logical memory block at 308, the security device can implement (1) a process to determine whether a logical memory block in the backend storage is available (and/or free) or unavailable, and/or (2) a process to mark a logical memory block as available (and/or free) or unavailable at 310.

At 312, an initialization vector for each logical memory block can be determined (e.g., by the encryption module). In some instances, for example, for encryption processes in which the initialization vectors are non-repeating (but not random), a counter can be used for the initialization vector. For example, an initial initialization vector can have a value of all zeroes and can be incremented each time a new value is used. For another example, an initial initialization vector can use all ones and can be decremented each time a new value is used. In some instances, the same initialization vector can be used for each block of memory being initialized. Alternatively, an initialization vector can be randomly generated for each block of memory.

In some instances, an initial content of each logical memory block can be pre-determined or generated randomly, at 314. Such a pre-determined value can be a value (such as all zeroes or all ones) or the content of documents being batch uploaded as part of initialization. Regardless of block content, because encryption randomizes the output, after encryption, the encrypted logical memory blocks can appear cryptographically non-distinguishable.

In some instances, at 316, the processor encrypts each logical memory block (i.e., the data within that logical memory block) using the initialization vector and the encryption key used for the zero-trust storage. The processor then uploads and writes the logical memory blocks to the backend storage, at 318. Because each logical memory block is encrypted and then uploaded to the backend storage and because the encryption key is not uploaded to the backend storage, the backend storage is unable to determine whether any documents are actually being uploaded along with the initialization step.

Figure 4:
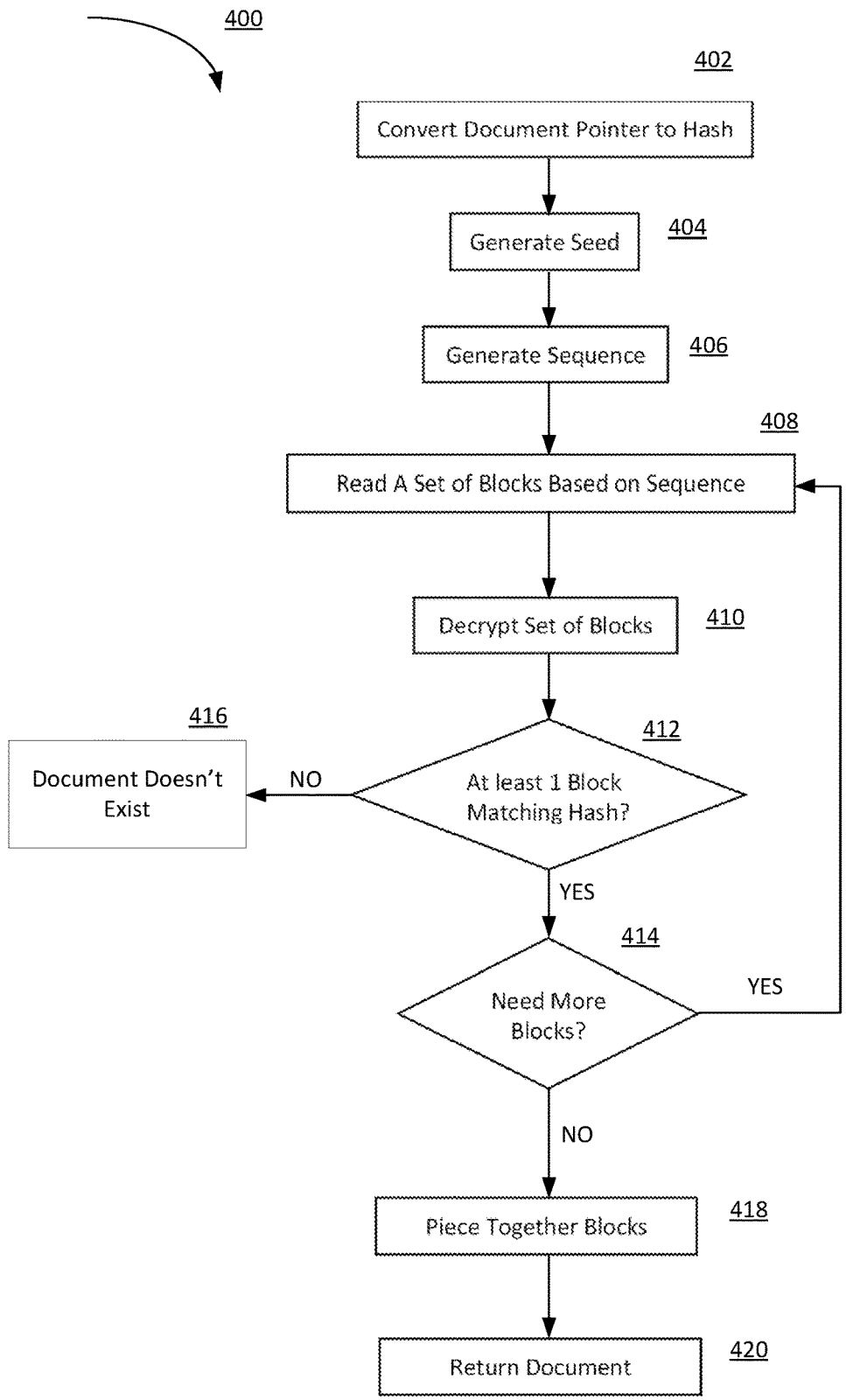
FIG. 4 is a flowchart illustrating a method of a download process, according to an embodiment.

FIG. 4 is a flowchart illustrating a method 400 of a download process, according to an embodiment. This method 400 can be implemented at a processor and/or a memory (e.g., processor 220 or memory 210 as discussed in FIG. 2) of a security device (such as the security device 105 in FIG. 1 and the security device 205 in FIG. 2). A frontend identifier and/or a pointer (or identifier such as a file name, a file path, a record locator, a file size, an author and/or other meta-data) to a document is received (e.g., at a randomizer module) and converted to a hash value (e.g., using any suitable hash function), at 402. This hash value can be used as an input to a seed mapping function to generate a seed, at 404. In other instances, the hash value can be used as a seed. In still other instances, any other suitable identifier can be used instead of a hash.

The seed (and any other suitable parameters such as a range, a cryptographic key and/or the like) can be used as an input (e.g., at a pseudorandom number generator) to generate a sequence of numbers (e.g., using any suitable sequence generating function or "pseudorandom number generator") (also referred to herein as a set of logical block identifiers) at 406. This sequence of numbers can then be used (e.g., by the storage module) to retrieve data from a set of memory blocks (e.g., retrieve data at a set of storage locations) from the backend storage, at 408. As discussed above, using a pseudorandom number generator to produce the set of numbers that correspond to the set of memory blocks randomizes where in the backend storage each block of data is stored. Similarly stated, the set of numbers can correspond to and/or be associated with memory locations in the backend storage.

The set of data blocks can then be sent (e.g., by the randomizer module to the decryption module), which can decrypt the data blocks, at 410 and return unencrypted data blocks (to the randomizer module, for example). In other instances, the data in the backend storage is not encrypted, and thus, the data blocks are not decrypted (e.g., by the decryption module).

It can be determined (e.g., by the randomizer module) if any of the returned blocks of data include a hash value produced by the document meta-data and/or an identifier associated with the document, at 412. Specifically, it can be determined (e.g., by the randomizer module) whether the retrieved data is part of the requested document by matching one or more identifier(s) stored with the data block (or a hash value produced based on the identifier(s)) and the hash value (or other identifier). If none of the blocks of data match the hash value, at 416, the document is determined to not be stored in the backend storage. If at least one block of data matches the hash value, any additional blocks of data can be retrieved (e.g., by the storage module) using remaining numbers from the sequence of numbers, at 414. After the blocks of data associated with the file have been retrieved and decrypted, they can be pieced together and/or compiled (e.g., using the sequence of numbers to identify order), at 418. The compiled document can then be returned to the frontend system, at 420.

In some instances, to hide meta-data that may provide enough information of the document or the frontend system to compromise either or both the document or the system, the download process can be run regardless of file or storage operation (whether the actual file/storage operation is read, write, append, delete, or update). For example, even if the user knows that a new document is being written and there is thus no need to check whether this document already exists in the system, for the overall security of the system and to hide from the backend storage that a new document is being written, the download process can be run to fetch the data blocks corresponding to the sequence generated from the seed based on the document identifier. In some instances, the download process can (1) obscure the access pattern of the backend storage by downloading a set of data blocks with each operation, and (2) download an initial set of data blocks to either identify whether a document exists in the backend storage already (to read/return the content, delete the content, or append/update the content), or to find suitable free logical memory blocks for new document (write) or new content of the existing document (append/update the content).

Figure 5:
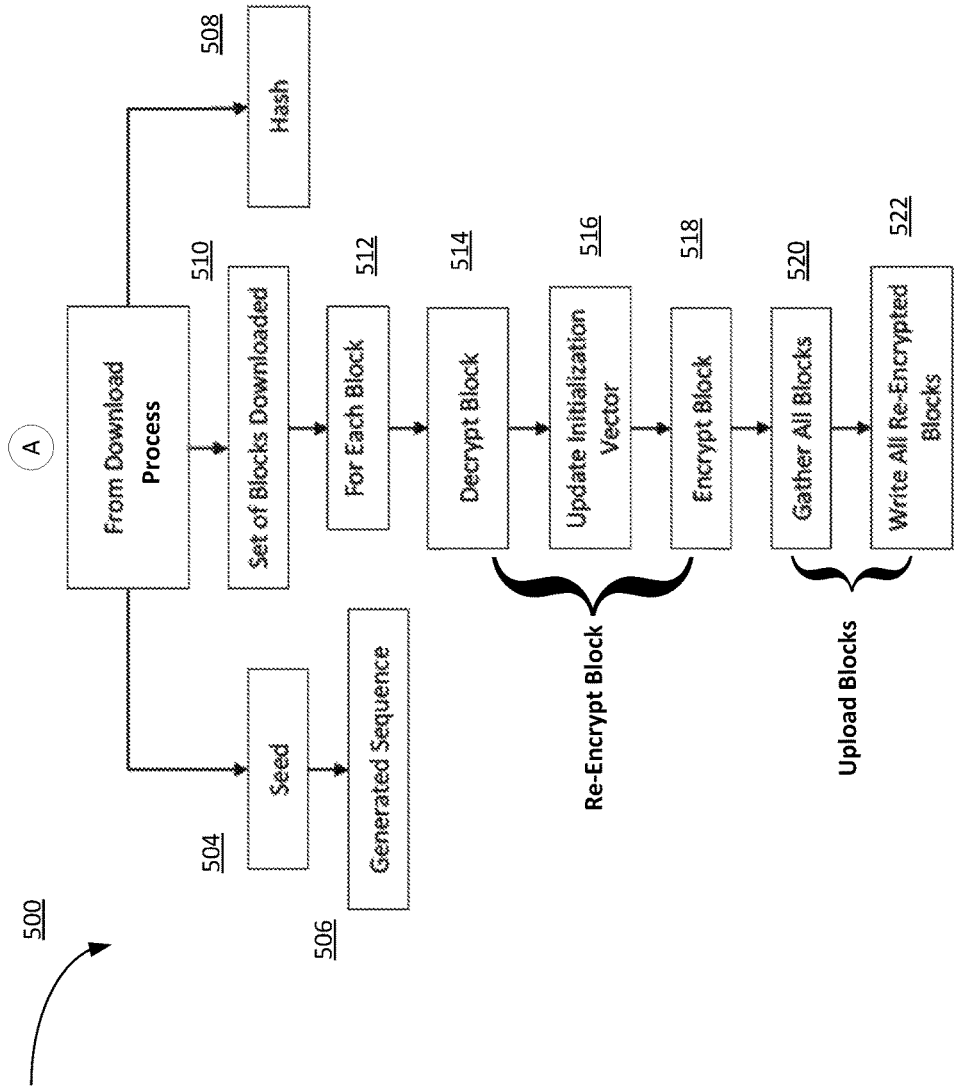
FIG. 5 is a flowchart illustrating a method of an upload process, according to an embodiment.

FIG. 5 is a flowchart illustrating a method of an upload process in the case of a read operation, according to an embodiment. This method 500 can be implemented at a processor and/or a memory (e.g., processor 220 or memory 210 as discussed in FIG. 2) of a security device (such as the security device 105 in FIG. 1 and the security device 205 in FIG. 2). In some instances, the upload process 500 is performed after the download process (e.g., after the download process described with respect to FIG. 4). In such instances, regardless of whether the document already exists in the backend storage, a set of data blocks from the download operation can be received (e.g., by the randomizer module), at 510. The set of data blocks can correspond to the sequence generated from the pseudorandom number generator based on a seed generated from a seed mapping function (e.g., hashing or other mapping) using the document identifier as an input to the seed mapping function.

The randomizer module, for example, depending on whether it stores the hash, seed, and/or sequence in memory, may or may not recalculate the hash, at 508, regenerate the seed, at 504 and/or regenerate the sequence, at 506, but these inputs can be used by the upload process as well as the download process. In some implementations, the randomizer module can already have the seed, the sequence, the hash, and the set of data blocks downloaded based on the download process. In other implementations, when the randomizer module does not have the seed, the generated sequence, the hash, and/or the set of data blocks, a hash value 508 (e.g., identifier) and/or a seed 504 can be regenerated/recalculated, and a sequence 506 can also be regenerated. Such newly generated hash value 508 (e.g., a document identifier), seed 504, and/or the sequence 506 can be stored and used in other steps of a download process (as described with respect to FIG. 4) and/or an upload process (as described with respect to FIGS. 5-8; e.g., steps 510-522 in FIG. 5).

To obfuscate the read operation from potential attackers that are able to observe a communication network, a zero-trust storage system (e.g., the zero-trust storage system 100 in FIG. 1) and/or storage operations of the backend storage, the download process can be followed by the upload process. In other instances, this obfuscation can be eliminated if network efficiency is more important than the security from the obfuscation. The purpose of the obfuscation is to prevent attackers from differentiating the read operation from the other operations (delete/write/update/append).

For each data block in the download set, at 512, the upload process can re-encrypt (at steps 514-518) each downloaded data block and then upload the data blocks back to the backend storage (at steps 520 and 522). Thus, from the perspective of backend storage, for either a read or write operation, the data blocks stored within a set of logical memory blocks are downloaded, and then each data block is uploaded back into the system regardless of whether the data block value changed. The same set of operations (download and then upload to rewrite each logical memory block) is also used in other operations (delete/write/update/append).

In some instances, the re-encryption process can include: (1) decrypt the block of data, at 514, (2) update the initialization vector for that block of data, at 516, and (3) encrypt the data block with the new updated initialization vector, at 518. For the decryption step 514, in some instances, some of the data blocks may have already been decrypted from the download process. To re-encrypt the data block, if nothing has changed (e.g., the content has not changed), the initialization vector can be changed so a different encrypted data block with the same content is produced. An example process is to use an encryption process with a counter as an initialization vector (e.g., increase the initialization vector every time the data block is re-encrypted). In some instances, the initialization vector can be combined with the underlying data such that the encrypted data includes both the underlying data and the initialization vector. In other instances, the initialization vector can be used to determine an encryption key used to encrypt the block of data. In such an instance, the initialization vectors for specific files can be stored (e.g., at the security device 205) such that the appropriate initialization vector can be used to decrypt data when retrieved. In either instance, the data uploaded to the backend storage can appear different to the backend storage.

In some instances, to hide which logical memory blocks or whether any logical memory blocks were used, the upload process can gather the data blocks that were downloaded, at 520 and re-encrypted, and then upload all of them (regardless of what data blocks have changed), at 522. In other instances, only a portion of the data blocks downloaded are uploaded, such as those that have changed in value. In still other instances, a random subset of the data blocks that did not change is uploaded with the modified data blocks.

Figure 6:
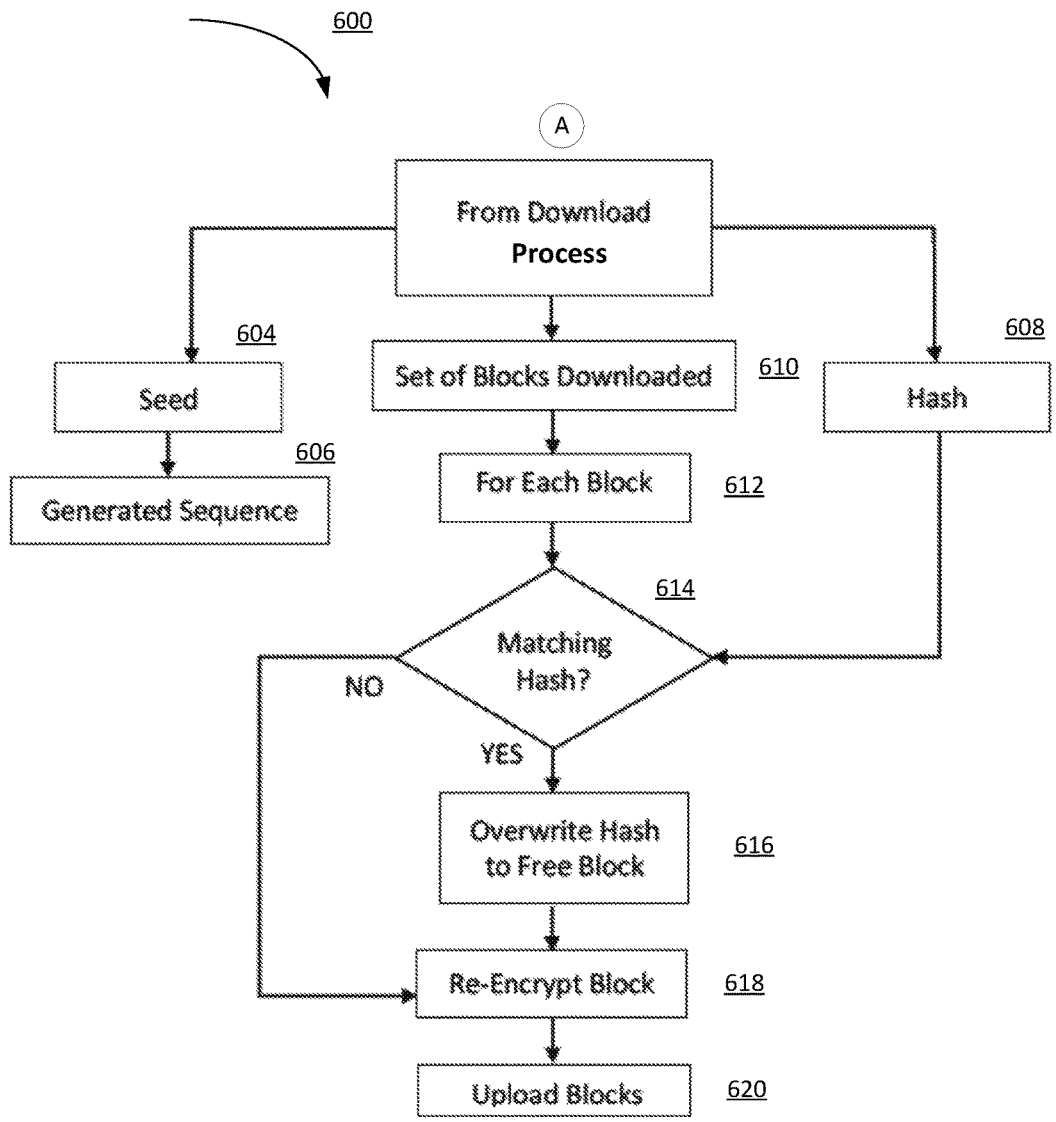
FIG. 6 is a flowchart illustrating a method of an upload process with respect to a delete operation, according to an embodiment.

FIG. 6 is a flowchart illustrating a method 600 of an upload process in the case of a delete operation, according to an embodiment. This method 600 can be implemented at a processor and/or a memory (e.g., processor 220 or memory 210 as discussed in FIG. 2) of a security device (such as the security device 105 in FIG. 1 and the security device 205 in FIG. 2). In some instances, similar to the upload process 500 described with respect to FIG. 5, the upload process 600 is performed after the download process (e.g., after the download process described with respect to FIG. 4). In such instances, regardless of whether the document already exists in the backend storage, a set of data blocks can be returned from the download operation (e.g., to the randomizer module), at 610. The set of data blocks can correspond to the sequence generated (e.g., from the pseudorandom number generator based on a seed generated from a seed mapping function (e.g., hashing or other mapping) of the document identifier.

The randomizer module, depending on whether it stores the hash, seed, and/or sequence in memory, may or may not recalculate the hash at 608, regenerate the seed at 604 and/or regenerate the sequence, at 606 but these inputs can be used by the upload process as well as the download process. In some implementations, the randomizer module can already have the seed 604, the sequence 606, the hash 608, and/or the set of data blocks downloaded based on the download process. In other implementations, when the randomizer module does not have the seed, the sequence, the hash (e.g., a document identifier), and/or the set of data blocks, a hash value 608 and/or a seed 604 can be regenerated/recalculated, and a sequence 606 can also be regenerated. Such newly generated hash value 608, seed 604, and/or the sequence 606 can be stored and used in other steps of a download process (as described with respect to FIG. 4) and/or an upload process (as described with respect to FIGS. 5-8; e.g., steps 610-620 in FIG. 6).

For each downloaded data block from the download process, at 612, data blocks with a hash value (or other identifier) that matches the document that is being deleted can be identified (e.g., by the randomizer module), at 614. The data blocks may already be decrypted and/or hash value identified from the download process. In either case, for each of the data blocks not matching the hash (or other document identifier stored with the data), the data block can be re-encrypted, at 618, in the same way as described in the upload process for read operations (see FIG. 5). For each of the data blocks matching the hash (or other identifier), the hash value can be rewritten (e.g., by the randomizer module), at 616, to the hash value(s) (or other identifier) used to mark a free logical memory block and then the data blocks can be re-encrypted in the same way, at 618. After each data block is re-encrypted, the data blocks can be gathered and uploaded back into the backend storage, at 620.

Figure 7:
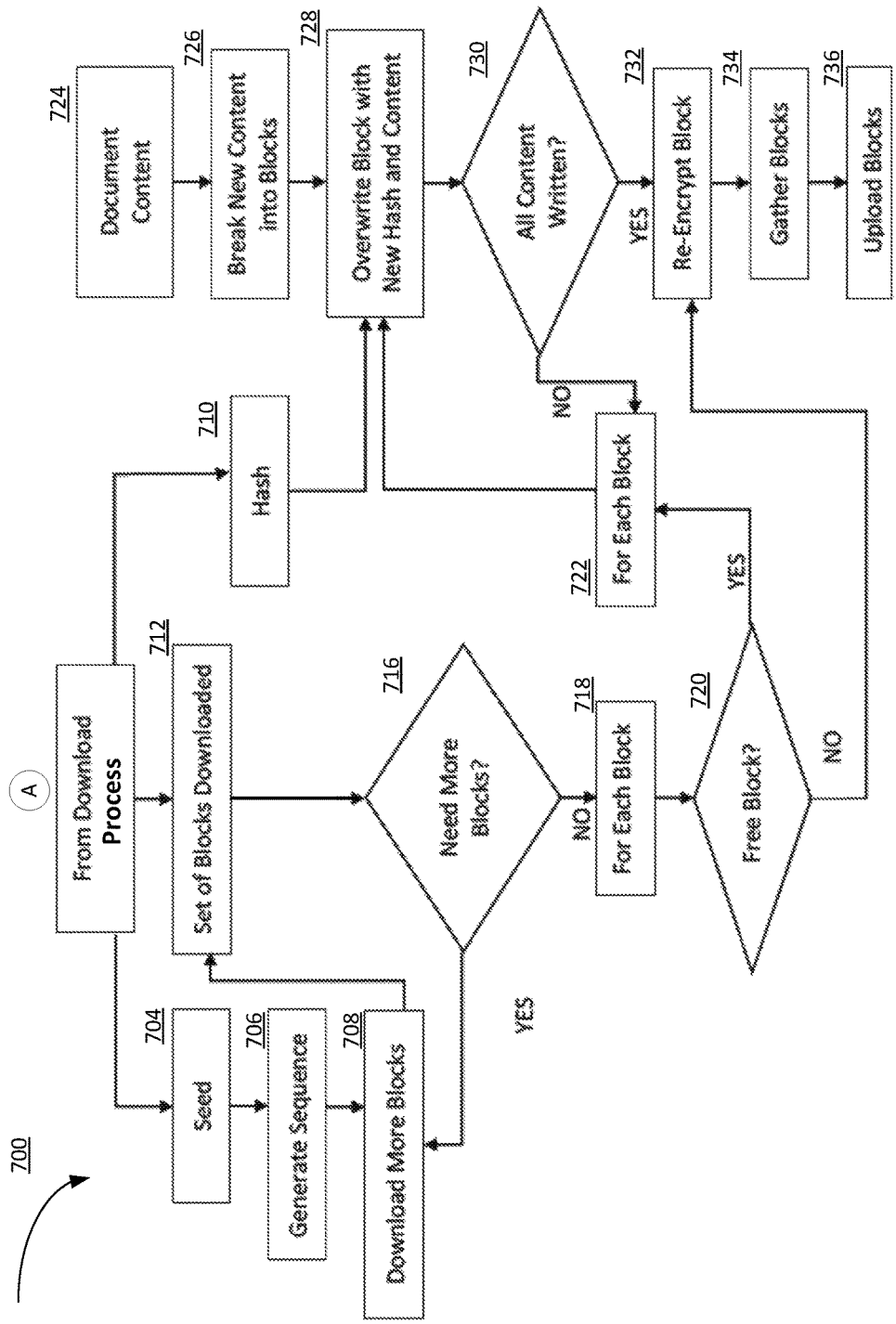
FIG. 7 is a flowchart illustrating a method of an upload process with respect to a write operation, according to an embodiment.

FIG. 7 is a flowchart illustrating a method 700 of the upload process in the case of a write operation, according to an embodiment. This method 700 can be implemented at a processor and/or a memory (e.g., processor 220 or memory 210 as discussed in FIG. 2) of a security device (such as the security device 105 in FIG. 1 and the security device 205 in FIG. 2). In some instances, the upload process 700 is performed after the download process (e.g., after the download process described with respect to FIG. 4). In such instances, regardless of whether the document already exists in the backend storage, the randomizer module can have a set of data blocks returned from a set of logical memory blocks (a set of storage locations) returned from the download operation, at 712. The set of logical memory blocks can correspond to the sequence generated from the pseudorandom number generator based on a seed generated from a seed mapping function (e.g., hashing or other mapping) of the document identifier.

The randomizer module, depending on whether it stores the hash, seed, and/or sequence in memory, may or may not recalculate the hash, at 710, regenerate the seed, at 704 and/or regenerate the sequence, at 706, but these inputs can be used by the upload process as well as the download process. In some implementations, the randomizer module can already have the seed 704, the sequence 706, the hash 710, and/or the set of data blocks downloaded based on the download process. In other implementations, when the randomizer module does not have the seed, the sequence, the hash, and/or the set of data blocks in memory, a hash value 710 (e.g., a document identifier) and/or a seed 704 can be regenerated/recalculated, and a sequence 706 can also be regenerated. Such newly generated hash value 710, seed 704, and/or the sequence 706 can be stored and used in other steps of a download process (as described with respect to FIG. 4) and/or an upload process (as described with respect to FIGS. 5-8; e.g., steps 712-736 in FIG. 7).

The processor downloads data stored within a set of logical memory blocks, at 712, and then determines if more logical memory blocks are needed to store the document content, at 716. The processor downloads the data stored within more logical memory blocks, at 708, if it is determined that more logical memory blocks are needed. For each downloaded data stored within a logical memory block from the download process, at 718, the randomizer module can identify logical memory blocks marked as free, at 720 (or a subset of storage locations) and/or available to be written. In some instances, the logical memory blocks may already be identified as free from the download process. The document content, received at 724, can be broken into portions (also referred to herein as "portions," "data blocks," and "segments") that fit into each logical memory block, at 726. The portions can be written to the free logical memory blocks, at 728. If a number of free logical memory blocks needed to store the data is greater than the number of free logical memory blocks already downloaded or accessed, the process can download or access more memory blocks according to the sequence generated by the hash, at 708.

For each of the free logical memory blocks, the process can overwrite each free logical memory block with a portion of the content and the hash value (or other identifier) corresponding to the document, at 728, to mark the logical memory block as belonging to the document thus not free anymore. After the document content portions are written, at 730, the remaining free data blocks downloaded or accessed and the data blocks to be stored with the content portions undergo the same re-encryption, at 732 and upload steps as described with respect to the other operations, at 734 and 736.

Figure 8:
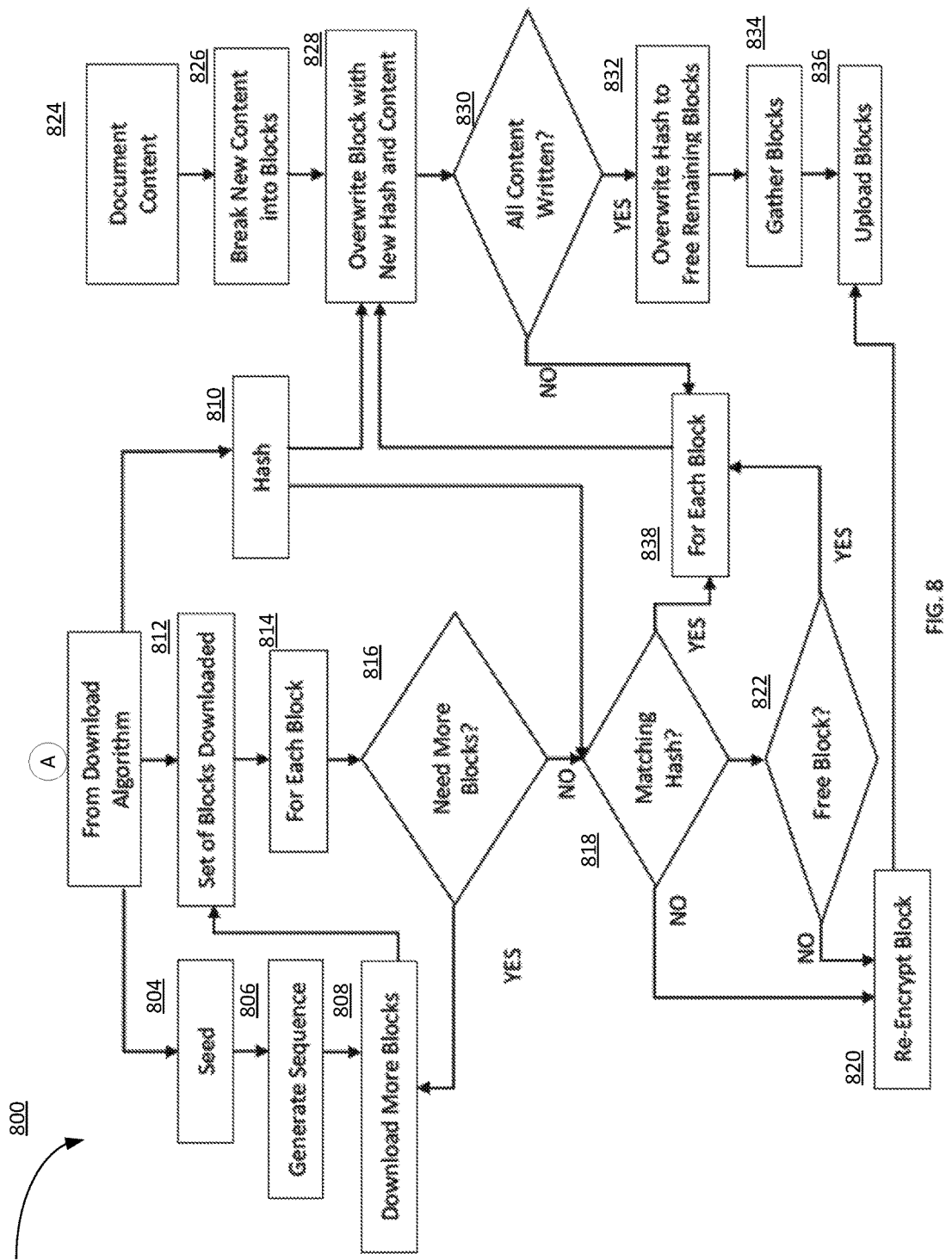
FIG. 8 is a flowchart illustrating a method of the upload process with respect to an update/append operation, according to an embodiment.

FIG. 8 is a flowchart illustrating a method 800 of the upload process in the case of either an update or an append operation, according to an embodiment. This method 800 can be implemented at a processor and/or a memory (e.g., processor 220 or memory 210 as discussed in FIG. 2) of a security device (such as the security device 105 in FIG. 1 and the security device 205 in FIG. 2). In some instances, the upload process 800 is performed after the download process (e.g., after the download process described with respect to FIG. 4). In such embodiments, regardless of whether the document already exists in the backend storage, the randomizer module can have the data from a set of logical memory blocks returned from the download operation, at 812. The set of logical memory blocks can correspond to the sequence generated from the pseudorandom number generator based on a seed generated from a seed mapping function (e.g., hashing or other mapping) of the document identifier.

The randomizer module, depending on whether it stores the hash, seed, and/or sequence in memory, may or may not recalculate the hash, at 810, regenerate the seed, at 804, and/or regenerate the sequence, at 806, but these inputs can be used by the upload process as well as the download process. In some implementations, the randomizer module can already have the seed 804, the sequence 806, the hash 810, and/or the set of data blocks downloaded based on the download process. In other implementations, when the randomizer module does not have the seed 804, the sequence 806, the hash 810, and/or the set of blocks in memory, a hash value 810 and/or a seed 804 can be regenerated/recalculated, and a sequence 806 can also be regenerated. Such newly generated hash value 810, seed 804, and/or the sequence 806 can be stored and used in other steps of a download process (as described with respect to FIG. 4) and/or an upload process (as described with respect to FIGS. 5-8; e.g., steps 812-836 in FIG. 8).

The processor downloads data from additional memory blocks, at 808, if it is determined that more memory blocks are needed. For each downloaded or accessed memory block, at 814, the processor determines if more memory blocks are needed at 816.

The update and append operation are similar in that the backend storage already has a document with the same hash value (or identifier) and the document is to be modified. In the case of append, the new document will be longer but in the case of update the new document can be shorter, same, or longer.

For each downloaded (or accessed) logical memory block from the download process, the logical memory blocks marked with the matching hash value (or other identifier associated with the document), at 818, are deleted and then grouped together with the free logical memory blocks. For each logical memory block in the set, the upload process can repeat many of the same steps as the write operation. For each downloaded (or accessed) logical memory block from the download process, the randomizer module can identify logical memory blocks marked as free, at 822, (or a subset of storage locations) and/or available to be written. In some instances, the logical memory blocks may already be identified as free from the download process.

The document content, at 824, can be broken into portions that fit into each logical memory block, at 826. The portions can be written to the free logical memory blocks (or logical memory blocks matching the hash value or other document identifier in the case of an append), at 828. If a logical number of free memory blocks needed to store the data is greater than the number of free logical memory blocks already downloaded (or accessed), the process can download (or access) more logical memory blocks according to the sequence generated by the seed, at 808. Each of the free logical memory blocks can be overwritten with the content of a portion and the hash value (or other identifier) corresponding to the document, at 828, to mark the logical memory block as belonging to the document thus not free anymore.

In some instances, however, instead of just searching for free logical memory blocks, the randomizer module can find each of the logical memory blocks having data matching the hash (or other identifier associated with the document). Moreover, after the document portions are written to the logical memory blocks, at 830, any remaining logical memory blocks matching the hash (or other identifier) can be overwritten, at 832, with the hash (or other identifier) marking the logical memory block as free and/or available.

In such instances, even in the case where the document is updated with exactly the same content as before, if there are some free logical memory blocks in the sequence that come before existing logical memory blocks used for the old document portion, the new portions can be written to new logical memory blocks with the old logical memory blocks now marked as free. This can happen for none, one, some, or all of the existing logical memory blocks containing the document portions.

After the portions are written and memory blocks either marked with the matching hash (or other identifier) or free, the data in the memory blocks (along with the non-free and non-matching memory blocks) can be re-encrypted, at 820, gathered, at 834, and uploaded, at 836, just as with the other operations.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Alternatively, instead of using the pseudorandom number generator, in some instances, a mapping table that maps the frontend document identifier to the backend document identifier for the documents stored in the zero-trust storage can be used. Such a mapping table does not scale as well as the system described above and the mapping table itself stores more information regarding the file stored in the zero-trust storage than the system described above. Such a mapping table could potentially leak the actual document identifiers used to retrieve the documents stored in the zero-trust storage. The mapping table can also become large both in memory and on disk. As such, the embodiment using pseudo-random number generator is potentially more secure and more memory efficient as there is no single catalog of the documents stored in the zero-trust storage.

While some steps in the processes and/or methods described with respect to the flow charts in FIGS. 3-8 refer are described to be performed by a specific module (e.g., the randomizer module 213 of the security device 205 or the zero-trust storage system 100), in other embodiments, such steps can be performed by any other suitable module(s), processor(s), device(s) and/or the like.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory; and
a processor operatively coupled to the memory,
the processor configured to store a plurality of data portions of a data file in a first set of storage locations associated with a first set of logical block identifiers in a database, the data file associated with an identifier,
the processor configured to receive, from a compute device, (1) an instruction to read the data file within the database and (2) the identifier,
the processor configured to identify, based on the identifier, a second set of logical block identifiers associated with a second set of storage locations in the database,
the processor configured to retrieve data from each storage location from the second set of storage locations using the second set of logical block identifiers,
the processor configured to identify, based on the data retrieved from each storage location from the second set of storage locations, the first set of storage locations, the data stored at each storage location from the first set of storage locations pertaining to the data file, the first set of storage locations being a subset of the second set of storage locations,
the processor configured to compile the data file based on the data within the first set of storage locations and send the data file to the compute device,
the processor configured to modify an initialization vector for the data stored at each storage location from the second set of storage locations to define modified data for each storage location from the second set of storage locations,
the processor configured to encrypt the modified data for each storage location from the second set of storage locations to generate encrypted data for that storage location from the second set of storage locations,
the processor configured to send a signal to the database to write the encrypted data for each storage location from the second set of storage locations to that storage location from the second set of storage locations within the database.

2. The apparatus of claim 1, wherein the second set of logical block identifiers is a set of pseudorandom logical block identifiers,
the processor is configured to identify the second set of pseudorandom logical block identifiers by identifying a seed based at least in part on the identifier associated with the data file and calculating the second set of pseudorandom logical block identifiers for the database based on the seed.

3. The apparatus of claim 1, wherein the first set of logical block identifiers is not stored in long-term memory.

4. The apparatus of claim 1, wherein the identifier is specific to the compute device.

5. The apparatus of claim 1, wherein the processor is configured to identify the second set of logical block identifiers using a cryptographic pseudorandom hash function with the identifier associated with the data file as an input to the cryptographic pseudorandom hash function.

6. The apparatus of claim 1, wherein the compute device is from a plurality of compute devices, the processor is configured to receive, from each compute device from the plurality of compute devices, (1) an instruction to read a set of data files within the database and (2) a set of identifiers associated with the set of data files.

7. The apparatus of claim 1, wherein the database is from a plurality of databases, the processor is configured to receive, from the compute device, (1) a set of instructions to read a set of data files within the plurality of databases and (2) a set of identifiers associated with the set of data files.

8. The apparatus of claim 1, wherein the data file is an encrypted search index.

9. A method, comprising:
storing a plurality of data portions of a data file in a first set of storage locations associated with a first set of logical block identifiers in a database, the data file associated with an identifier,
receiving, from a compute device, (1) an instruction to read the data file within the database and (2) the identifier,
identifying, based on the identifier, a second set of logical block identifiers associated with a second set of storage locations in the database,
retrieving data from each storage location from the second set of storage locations using the second set of logical block identifiers,
identifying, based on the data retrieved from each storage location from the second set of storage locations, the first set of storage locations, the data stored at each storage location from the first set of storage locations pertaining to the data file, the first set of storage locations being a subset of the second set of storage locations,
compiling the data file based on the data within the first set of storage locations and send the data file to the compute device,
modifying an initialization vector for the data stored at each storage location from the second set of storage locations to define modified data for each storage location from the second set of storage locations,
encrypting the modified data for each storage location from the second set of storage locations to generate encrypted data for that storage location from the second set of storage locations, and
sending a signal to the database to write the encrypted data for each storage location from the second set of storage locations to that storage location from the second set of storage locations within the database.

10. The method of claim 9, wherein the second set of logical block identifiers is a set of pseudorandom logical block identifiers,
the method includes identifying the set of pseudorandom logical block identifiers by identifying a seed based at least in part on the identifier associated with the data file and calculating the set of pseudorandom logical block identifiers for the database based on the seed.

11. The method of claim 9, wherein the first set of logical block identifiers is not stored in long-term memory.

12. The method of claim 9, wherein the identifier is specific to the compute device.

13. The method of claim 9, further comprising identifying the second set of logical block identifiers using a cryptographic pseudorandom hash function with the identifier associated with the data file as an input to the cryptographic pseudorandom hash function.

14. The method of claim 9, wherein the compute device is from a plurality of compute devices,
the method includes receiving, from each compute device from the plurality of compute devices, (1) an instruction to read a set of data files within the database and (2) a set of identifiers associated with the set of data files.

15. The method of claim 9, wherein the database is from a plurality of databases, the method includes receiving, from the compute device, (1) a set of instructions to read a set of data files within the plurality of databases and (2) a set of identifiers associated with the set of data files.

16. The method of claim 9, wherein the data file is an encrypted search index.

17. A non-transitory processor-readable medium storing code representing instructions to be executed by a processor, the code comprising code to cause the processor to:
store a plurality of data portions of a data file in a first set of storage locations associated with a first set of logical block identifiers in a database, the data file associated with an identifier, receive, from a compute device, (1) an instruction to read the data file within the database and (2) the identifier,
identify, based on the identifier, a second set of logical block identifiers associated with a second set of storage locations in the database,
retrieve data from each storage location from the second set of storage locations using the second set of logical block identifiers,
identify, based on the data retrieved from each storage location from the second set of storage locations, the first set of storage locations, the data stored at each storage location from the first set of storage locations pertaining to the data file, the first set of storage locations being a subset of the second set of storage locations,
compile the data file based on the data within the first set of storage locations and send the data file to the compute device,
modify an initialization vector for the data stored at each storage location from the second set of storage locations to define modified data for each storage location from the second set of storage locations,
encrypt the modified data for each storage location from the second set of storage locations to generate encrypted data for that storage location from the second set of storage locations, and
send a signal to the database to write the encrypted data for each storage location from the second set of storage locations to that storage location from the second set of storage locations within the database.

18. The non-transitory processor-readable medium of claim 17, wherein the second set of logical block identifiers is a set of pseudorandom logical block identifiers,
the non-transitory processor-readable medium includes code to cause the processor to identify the set of pseudorandom logical block identifiers by identifying a seed based at least in part on the identifier associated with the data file and calculating the set of pseudorandom logical block identifiers for the database based on the seed.

19. The non-transitory processor-readable medium of claim 17, wherein the first set of logical block identifiers is not stored in long-term memory.

20. The non-transitory processor-readable medium of claim 17, wherein the identifier is specific to the compute device.

21. The non-transitory processor-readable medium of claim 17, further comprising code to cause the processor to identify the second set of logical block identifiers using a cryptographic pseudorandom hash function with the identifier associated with the data file as an input to the cryptographic pseudorandom hash function.

22. The non-transitory processor-readable medium of claim 17, wherein the compute device is from a plurality of compute devices,
the non-transitory processor-readable medium includes code to cause the processor to receive, from each compute device from the plurality of compute devices, (1) an instruction to read a set of data files within the database and (2) a set of identifiers associated with the set of data files.

23. The non-transitory processor-readable medium of claim 17, wherein the database is from a plurality of databases, the non-transitory processor-readable medium includes code to cause the processor to receive, from the compute device, (1) a set of instructions to read a set of data files within the plurality of databases and (2) a set of identifiers associated with the set of data files.

24. The non-transitory processor-readable medium of claim 17, wherein the data file is an encrypted search index.

25. The non-transitory processor-readable medium of claim 17, wherein the compute device is a first compute device, the data file is a first data file, the instruction is a first instruction, the identifier is a first identifier, the signal is first signal,
the non-transitory processor-readable medium further includes code to cause the processor to:
receive, from a second compute device, (1) a second instruction to write a second data file within the database and (2) a second identifier associated with the second data file;
identify, based on the second identifier, a third set of logical block identifiers associated with a third set of storage locations of the database;
retrieve data from each storage location from the third set of storage locations using the third set of logical block identifiers;
identify, based on the data retrieved from each storage location from the third set of storage locations, a set of available storage locations from the third set of storage locations;
parse the second data file into a set of data portions; and
send a second signal to the database to write each data portion from the set of data portions to a different storage location from the set of available storage locations.

26. The non-transitory processor-readable medium of claim 25, wherein the third set of logical block identifiers is not stored in long-term memory.

27. The non-transitory processor-readable medium of claim 25, further comprising code to cause the processor to identify the third set of logical block identifiers using a cryptographic pseudorandom hash function with the second identifier associated with the second data file as an input to the cryptographic pseudorandom hash function.

\* \* \* \* \*